(12) United States Patent
Palgen

(10) Patent No.: US 9,308,780 B2
(45) Date of Patent: Apr. 12, 2016

(54) TIRE TREAD HAVING INCISIONS

(75) Inventor: Marie-Claude Palgen, Riom (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 586 days.

(21) Appl. No.: 13/637,234

(22) PCT Filed: Mar. 17, 2011

(86) PCT No.: PCT/EP2011/054065
§ 371 (c)(1),
(2), (4) Date: Oct. 11, 2012

(87) PCT Pub. No.: WO2011/120817
PCT Pub. Date: Oct. 6, 2011

(65) Prior Publication Data
US 2013/0126062 A1    May 23, 2013

(30) Foreign Application Priority Data
Mar. 31, 2010  (FR) ..................................... 10 52392

(51) Int. Cl.
*B60C 11/12*        (2006.01)
(52) U.S. Cl.
CPC ............. *B60C 11/12* (2013.01); *B60C 11/1218* (2013.04); *B60C 11/1281* (2013.04); *B60C 2011/1209* (2013.04)
(58) Field of Classification Search
CPC .. B60C 11/12; B60C 11/1204; B60C 11/1218
See application file for complete search history.

(56) References Cited

U.S. PATENT DOCUMENTS

| 4,994,126 A | | 2/1991 | Lagnier |
| 5,095,963 A | * | 3/1992 | Maitre ..................... 152/209.18 |
| 6,668,886 B1 | | 12/2003 | Iwamura |

FOREIGN PATENT DOCUMENTS

| EP | 0 378 090 A1 | 7/1990 |
| EP | 1 029 714 A2 | 8/2000 |
| JP | 9-272312 A | 10/1997 |
| JP | 10-315715 | * 12/1998 |
| JP | 11-151914 A | 6/1999 |

OTHER PUBLICATIONS

International Search Report (PCT/ISA/210) issued on May 19, 2011, by the European Patent Office as the International Searching Authority for International Application No. PCT/EP2011/054065.

* cited by examiner

*Primary Examiner* — Steven D Maki
*Assistant Examiner* — Robert Dye
(74) *Attorney, Agent, or Firm* — Dickinson Wright PLLC

(57) ABSTRACT

A tread for a tire with raised elements delimited by cuts, at least one of these raised elements having a sipe of a maximum depth at most equal to the thickness of the tread, and running in a main direction determined by the ends of the sipe on the tread surface in the as-new condition and a secondary direction running into the thickness of the tread, having a first part, running in the secondary direction between the contact face in the as-new condition and a depth at least equal to 40% of the maximum depth and a second part extending the first part into the thickness of the tread, and extending over a depth. The second part has, in the main direction of the sipe, at least one first portion and at least one second portion, each having a length less than the length (L).

8 Claims, 3 Drawing Sheets

TIRE TREAD HAVING INCISIONS

FIELD OF THE INVENTION

The present invention relates to tyre treads and notably to the sipes with which these treads are provided. It also relates to the elements used to mould such sipes.

PRIOR ART

It is known practice for a tread of a tyre intended to be fitted to a passenger vehicle or a heavy goods vehicle to be provided with a plurality of sipes in order to generate a great many edge corners of material without however excessively reducing the rigidity of the tread and without excessively increasing the groove ratio of this tread.

During running, the tread becomes worn and therefore the height of the raised elements decreases resulting in an increase in their rigidity. Patent EP 0 378 090-B1 has proposed providing these treads with sipes which double up once a predetermined depth is reached.

Document EP 1 029 714-A1 describes an alternative variation whereby from a determined depth onward, a sipe divides into sipe parts which alternately diverge from the mean plane of the sipe. In that case, the total length of the edge corners generated by this sipe is the same as the initial length generated by the sipe on the tread surface of the tread in the as-new condition.

Document JP 11151914 describes a sipe which, beyond a determined depth, subdivides in certain regions into two sipe parts diverging from one another, these two sipe parts meeting at least at one of their ends with a sipe that is itself formed in the extension of the sipe opening onto the tread surface in the as-new condition. In the latter instance, although the length of sipe increases from a determined depth onward, an appreciable reduction in the rigidity of the raised element within which the sipe is formed is noted.

DEFINITIONS

A block is a raised element formed on a tread, this element being delimited by hollows or grooves and comprising lateral walls and a contact face, the latter being intended to come into contact with the road surface during running.

A rib is a raised element formed on a tread, this element being delimited by two grooves. A rib comprises two lateral walls and a contact face, the latter being intended to come into contact with the road surface.

A radial direction means a direction perpendicular to the axis of rotation of the tyre (this direction corresponds to the direction of the thickness of the tread).

An axial direction means a direction parallel to the axis of rotation of the tyre.

A circumferential direction means a direction tangential to any circle centred on the axis of rotation. This direction is perpendicular both to the axial direction and to a radial direction.

A cut means either a groove or a sipe and corresponds to the space delimited by the walls of material facing one another and distant from one another by a non-zero distance. What differentiates a sipe from a groove is the value adopted by this distance; in the case of a sipe, this distance is suited to allowing the opposing walls to come into contact as the sipe passes through the contact patch where the tyre makes contact with the road surface. This distance for a sipe is in this instance at most equal to 2 millimeters (mm). In the case of a groove the walls of this groove cannot come into contact with one another under normal running conditions:

The main direction of a sipe corresponds to the mean direction passing through the furthermost points of the sipe on the tread surface of the tread in the unworn as-new condition.

The secondary direction is defined as being the direction perpendicular to the main direction of a sipe and extending into the thickness of the tread.

BRIEF SUMMARY OF THE INVENTION

The present invention seeks to improve the performance of tyres whether in the as-new condition by giving their tread suitable rigidity or following partial wearing of the tread while regaining a total edge-corners length that is greater than the length of edge corners in the as-new condition.

To this end, one subject of the invention is a tread for a tyre; this tread made of a rubber compound has a thickness E equal to the maximum depth of the cuts and comprises a plurality of raised elements delimited by cuts, each raised element comprising a contact face intended to come into contact with the road surface and lateral faces intersecting this contact face along edge corners, the collection of contact faces of the raised elements forming a tread surface of the tread, at least one of these raised elements comprising at least one sipe of a maximum depth H at most equal to the thickness E of the tread, this sipe running in a main direction determined by the ends of the line of the sipe on the tread surface in the as-new condition and a secondary direction running into the thickness of the tread, this sipe being made up of a first part and a second part, the sipe first part running in the secondary direction between the tread surface in the as-new condition and a depth H1 at least equal to 40% of the maximum depth H and the sipe second part extending the first part into the thickness of the tread, this second part extending over a depth H2. The sipe first part, of total length L measured on the tread surface when the tread is in the as-new condition in the main direction, divides the raised element over the depth H1 into two raised-element parts which are disjointed from one another, because they are situated on either side of the sipe first part.

Furthermore, the sipe second part comprises, in the main direction of the sipe, at least one first portion and at least one second portion, these two portions each having a length less than the length L, each first portion being formed of a sipe comprising at least two branches disjointed from one another, these at least two branches being spaced from one another by a maximum distance D1, and each second portion, situated in the extension of a first portion in the main direction of the sipe and disjointed from any first portion, being formed in such a way as to create a mechanical connection between the extensions into the depth over the height H2 of the raised-element parts that are disjointed from one another between the tread surface and the depth H1.

By virtue of the invention, the two raised-element parts, disjointed from one another by the sipe between the tread surface in the as-new condition and a determined depth, are joined together on either side of the sipe for the last part of this sipe. This connection is made by the material of which the tread is made. Thus it is possible very appreciably to increase the length of the edge corners once the tyre has become partially worn while at the same achieving an overall rigidity for the raised elements which is suitable for obtaining improved tyre running performance, and to do so irrespective of whether the tyre is new or partially worn.

According to an alternative form of the invention, the tread according to the invention is such that each second portion comprises at least one sipe formed in the extension of the sipe extending over the depth H1 from the tread surface of the tread in the as-new condition, this at least one sipe being disjointed from the sipes of any first portion. Disjointed is to be understood as meaning that there is at least one mechanical connection connecting the extensions in the direction of the depth of the tread over the height H2 of the raised-element parts that are disjointed from one another between the tread surface and the depth H1. In this alternative form, a second portion may comprise a plurality of sipes, the latter not being connected to the sipes of the first portions in order to create continuity of material and thus points of connection between the parts of the tread that are situated on either side of the sipe over the height H2 of the second part.

As a preference, for this last alternative form, the tread is such that each second portion comprises a single sipe formed in the extension of the sipe extending over the depth H1. In the extension of does not necessarily here mean that the inclination of this single sipe with respect to the tread surface is the same as that of the sipe of the first part.

According to an alternative form of the invention, the single sipe of each second portion has a bottom formed by its points furthest towards the interior of the tread, and any point on the said bottom of the single sipe is situated a non-zero minimum distance A away from the branches of the first portions. This minimum distance A is a measurement of the mechanical connection made between those parts of the tread that are situated on either side of the sipe.

For preference, this minimum distance A is at least equal to 20% of the maximum distance D1 measuring the maximum distance between the sipes of the first sipe portions.

According to another advantageous alternative form of the invention, the single sipe formed on a second portion and in the extension of the sipe first part has a length L2 measured in the main direction of the sipe, that is such that at least part of this single sipe is interposed between two sipes of a first portion over a non-zero length of overlap B at most equal to 50% of the length L1 of each first portion, each first portion having the same length L1.

The benefit of such an arrangement is that it increases the length of edge faces after the tyre has become partially worn when the length of overlap B is non-zero. An upper limit is set at 50% of the length L1 of each first portion so that the sought after mechanical connection will be effective.

According to another alternative form of the invention, each second portion has no sipe and each first portion comprises at least three sipes, one of the said sipes being distant from at least two other sipes situated on either side of it by a minimum distance A at least equal to 20% of the distance D1. In an alternative form of this embodiment, one of the sipes is equidistant from the other two sipes.

Advantageously, and irrespective of the alternative form described hereinabove, a sipe according to the invention is such that its total length of edge corners formed after partial wear (i.e. once the tyre has become worn beyond the depth of the first part H1) is at least equal to 1.5 times the length of edge corners formed by that same sipe on the tread in the as-new condition.

For preference, the distance separating two sipe first portions is at least equal to 50% of the length L1 of each first portion, when the first portions have the same length or substantially the same length.

Advantageously, the distance L2 between two first sipe portions is at least equal to 50% of the length L1 of each first portion, each first portion having the same length L1.

Other features and advantages of the invention will become apparent from the description given hereinafter with reference to the attached drawings which, by way of nonlimiting examples, show alternative forms of the subject matter of the invention.

DESCRIPTION OF THE FIGURES

Figure 1:
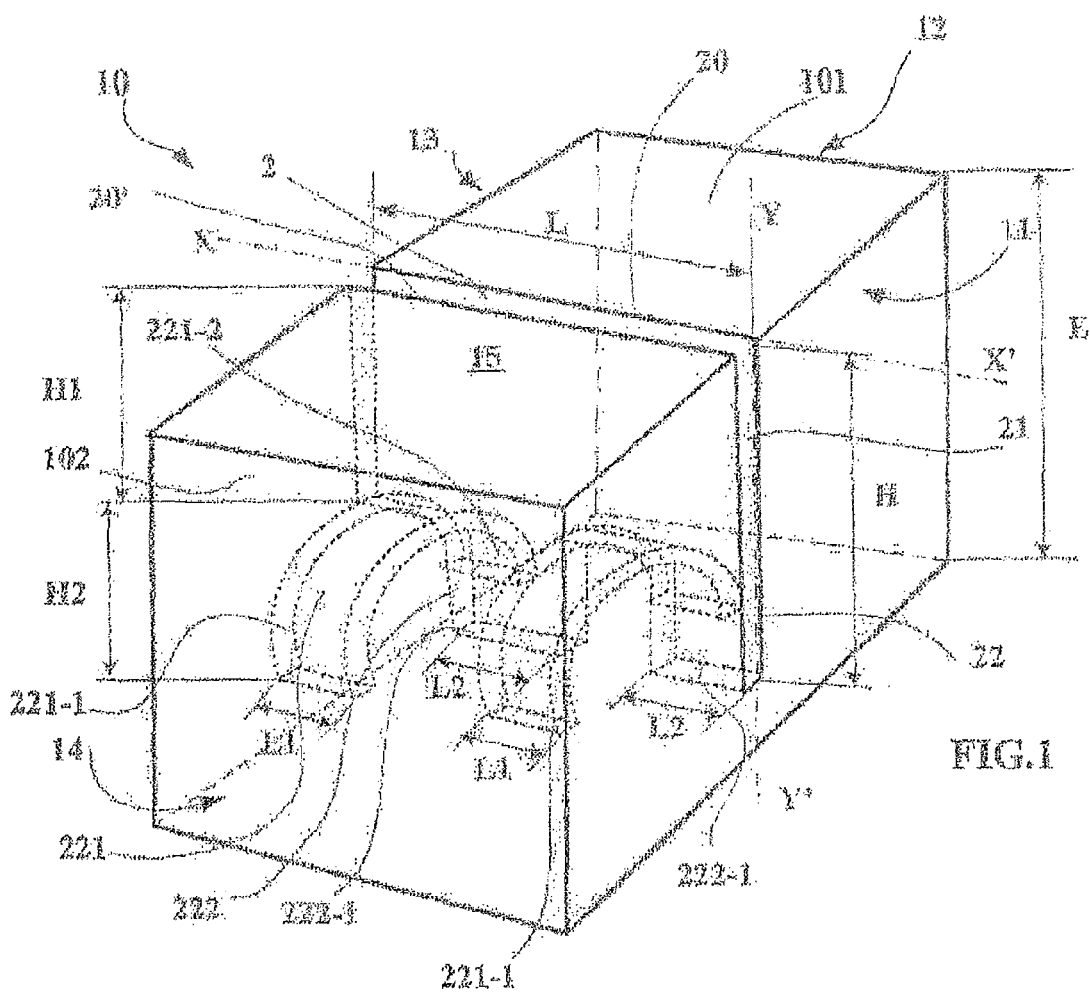
FIG. 1 is a view of a raised element of a tread according to the invention.

In the case of the figures that accompany this description, the same reference numerals are used to describe alternative forms of the invention when these reference signs refer to elements of the same kind, whether this be structural or functional.

FIG. 1 shows a raised element 10 of a tread made of a rubber compound for a tyre, this raised element 10 being delimited by four grooves. This block-shaped element 10 comprises four lateral faces 11, 12, 13, 14 and a contact face 15 intended to come into contact with a roadway. Each lateral face intersects the contact face to form edge corners. The tread has a thickness E here corresponding to the depth of the grooves that delimit the block.

This block 10 is provided with a sipe 2 according to the present invention which opens onto two of the lateral faces 11, 13 and onto the contact face 15; this sipe has a maximum depth H at most equal to the thickness E of the tread. This sipe 2 forms, on the contact face, two opposing edge corners 20, 20' of straight shape. The sipe 2 extends over the contact face 15 in a main direction XX' determined as being the straight line passing through the ends of the edge corners formed by the sipe on the contact face in the as-new condition; the sipe 2 extends into the thickness of the tread in a secondary direction perpendicular to the contact face (identified by the direction YY').

This sipe is made up of a first part 21 and of a second part 22, the sipe first part 21 extending in the secondary direction YY' between the contact face 15 in the as-new condition and a depth H1 here equal to 50% of the maximum depth H of the sipe and the sipe second part 22 extending the first part into the thickness of the tread. This second part 22 extends over a depth H2 which in this instance is substantially equal to H1.

The sipe first part 21, of total length L measured on the tread surface when the tread is in the as-new condition in the main direction, divides the block, from the contact face and over the depth H1, into two block parts 101, 102 disjointed from one another.

Furthermore, the sipe second part 22 comprises, in a direction parallel to the main direction XX' of the sipe 2, second portions 221 of length L1 and second portions 222 of length L2, these first and second portions each being of a length shorter than the length L. In this instance, the lengths L1 and L2 are equal to one quarter of the initial total length L of the sipe.

Each first portion 221 is formed by a pair of sipes 221-1, 221-2 disjointed from one another, these two branches being spaced apart by a maximum distance D1 at one of their ends.

Furthermore, each second portion 222 comprises a single sipe 222-1 formed in the extension, in the secondary direction, of the sipe first part 21; this single sipe 222-1 has the same inclination as the sipe first part 21. A second portion 222 is interposed between the two first portions 221 in the main direction XX' of the sipe and another second portion 222 is arranged in such a way as to open onto a lateral face of the element.

The single sipe 222-1 of each second portion 222 is disjointed from all the sipes 221-1, 221-2 of the first portions 221. Disjointed here means that the minimum distance A between any point on this single sipe 222-1 and any point on the sipes of the first portions is at least equal to 20% of the maximum distance D1 between the branches of the sipes 221-1, 221-2 of the first portions. In this particular instance, the single sipe 222-1 is formed in such a way that its ends 220 are a distance of 50% of D1 away from the ends 210, 210' of the sipes of the first parts. In the scenario depicted, there is no overlap, in the main direction of the sipe, between the sipes 221-1, 221-2 of the first portions and the sipes 222-1 of the second portions. This feature is visible in FIG. 3C which shows the lines of the sipes on the tyre surface when the tread has become partially worn.

Between the tread surface in the as-new condition and the depth H1, the sipe generates two block parts 101, 102 which are disjointed from one another.

In this example, it may be seen that the discontinuities between the sipes 221-1, 221-2 of the first portions 221 and the sipes 222-1 of the second portions 222 lead to the formation of mechanical connections between those parts of the block that are situated on each side of the sipe. Beyond a depth at least equal to H1, it is possible to establish continuity between the material situated on one side and that situated on the other side; thanks to this continuity it is possible to alter the rigidity of the tread pattern element while at the same time increasing the length of edge corners once the tyre has become partially worn.

Figure 2:
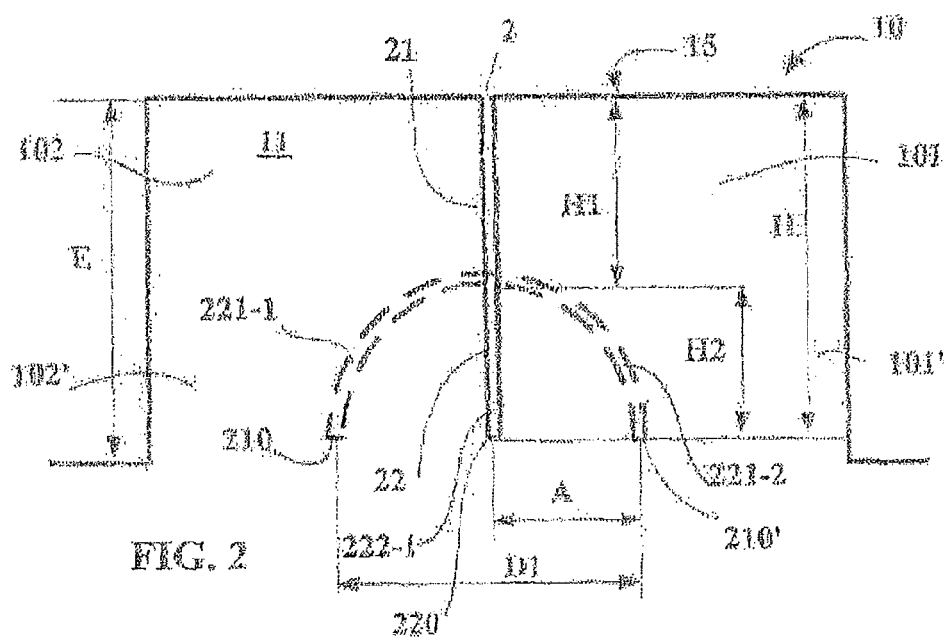
FIG. 2 is a view of a lateral face of the raised element depicted in FIG. 1.

FIG. 2 shows a view of a lateral face 11 of the block of FIG. 1. It may be seen that the sipe 2 of total depth H less than the height E of the block comprises a first part 21 of depth H1 opening onto the contact face 15 and extended in the direction of the thickness of the block by a second part 22 of depth H2.

All the branches of the sipes 221-1, 221-2, 222-1 of the first portions 221 and of the second portions 222 have ends furthest towards the inside of the block which all lie the same distance H away from the contact face 15 of the block in the as-new condition. In an alternative form that has not been depicted here, it is possible for each branch to have different depths: in such an instance, the height H2 corresponds to the greatest of the heights of the branches.

Each second portion of the sipe second part 22 has all the points of its end—corresponding to the final points of the said second portions to appear on the tread surface following wear—situated at a distance A equal to 50% of the distance D1, D1 measuring the maximum distance between the branches of one and the same first sipe portion. Thanks to the sipe according to the invention, it is possible to increase the total length of active edge corners on the tread surface while at the same time limiting the reduction in rigidity, by creating a mechanical connection between the parts 101', 102' situated on either side of the sipe 2.

Figure 3A:
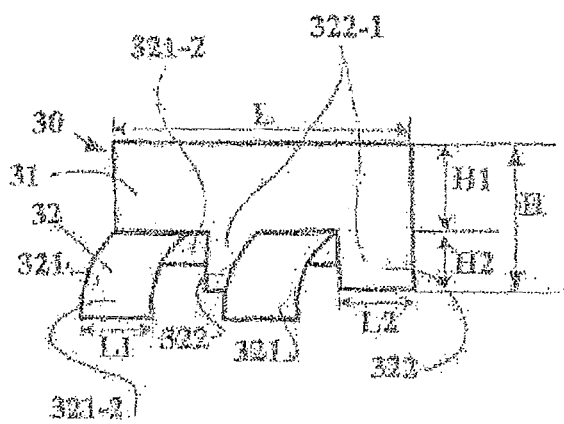
FIG. 3A is a view of a moulding element suitable for moulding a sipe as depicted in FIGS. 1 and 2.
Figure 3B:
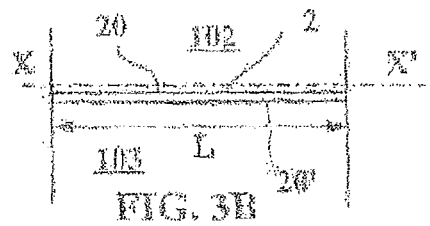
FIG. 3B shows the line on the tread of the sipe obtained with the moulding element of FIG. 3A, in the as-new condition.
Figure 3C:
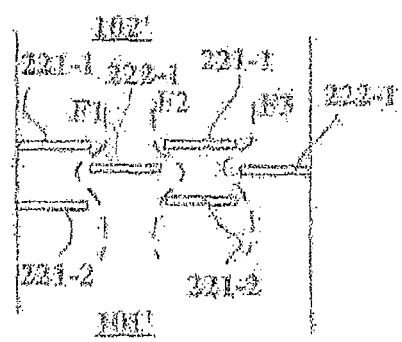
FIG. 3C shows the lines on the tread of the sipe obtained with the moulding element of FIG. 3A, in a partially worn state.

FIGS. 3A, 3B and 3C relate to one and the same configuration of sipe corresponding to the sipe as shown in FIGS. 1 and 2.

FIG. 3A gives a perspective view of a moulding element 30 for moulding the sipe shown in FIGS. 1 and 2. This moulding element 30 comprises an element first part 31 intended to project from the moulding surface of a mould used to manufacture a tread according to the invention, this first part having a height H1 and a length L. In the extension of this first part 31, an element second part 32 is formed over a height H2. This second part 32 comprises, in succession, in the main direction of the element (identified by XX'), two moulding element first portions 321 and two moulding element second portions 322, these portions 321, 322 being of equal lengths L1 and L2. Each first portion 321 comprises two blades 321-1, 321-2 diverging from one another and distant by a distance D1 at most. Between the first portions 321 is formed a single blade 322-1 having the same height H2 as the blades 321-1, 321-2 of the first portions. Another identical second portion 322 is formed in the main direction of the sipe towards the outside of a first portion 321. All the parts of the moulding element have substantially the same thickness which here is equal to 0.6 mm.

FIG. 3B shows the line of the sipe 2 obtained using the moulding element of FIG. 3A when the tread is in the as-new condition, i.e. on the contact face of the block in the initial condition before it is ever run. This line comprises two edge corners 20 and 20' of rectilinear geometry in the main direction XX' of the sipe and of length L.

FIG. 3C shows the lines of the same sipe when the tread has worn partially beyond the depth H1. It is possible to make out the hollows 221-1 and 221-2 or lines formed by each double branch of siping of the first portions 321 and each single sipe 222-1 of the second portions 322, all these hollows each having a length substantially equal to one quarter of the total length L of the sipe in the as-new condition. Whether in the as-new condition or after partial wear, the widths of the Sipes are the same and less than 1 mm (the width of a sipe means the mean distance separating the opposing faces that delimit said sipe). Of course sipes could be created that have different widths according to the regions by using blades of suitable thicknesses.

It may be seen that pairs of sipes 221-1, 221-2 are formed in each first portion, these sipes being at all points spaced apart by a maximum distance D1, and, between the first portions, in the direction XX', a single sipe 222-1 which has no region of overlap with the pairs of sipes (width of overlap here equal to zero). It can be seen that each single sipe 222-1 of the second portions is at least a minimum distance A away from any sipe 221-1, 221-2 of the first portions, this distance A being at least equal to 20% of the distance D1. In this particular instance, the distance A is approximately equal to 50% of the distance D1.

It can be seen in FIG. 3B that the sipe divides the block between a front part 101 and a rear part 102, these parts being disjointed from one another over the height H1 corresponding to the depth of the first part of the sipe. By contrast, the extensions 101', 102' of these front and rear parts towards the bottom of the block are mechanically connected to one another thanks to the formation of continuous lines of rubber compound, these continuous lines being indicated by the dotted lines F1, F2, F3.

In this configuration, it may be seen that the total length L of sipe in the as-new condition has increased very appreciably following partial wear revealing the sipe second part on the tread surface. The total length of edge corners when the tyre has become partially worn is here 1.5 times the initial length L.

Figure 4A:
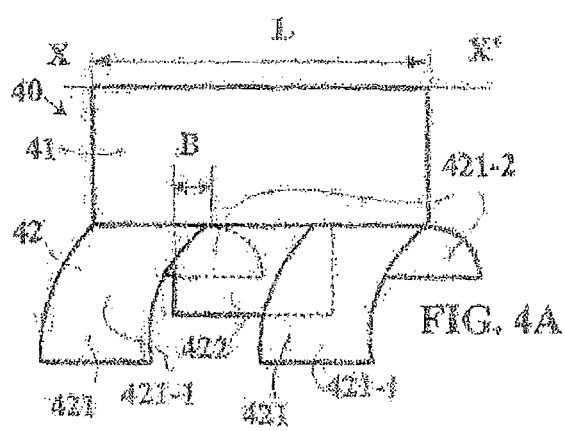
FIG. 4A is a view of a moulding element suitable for moulding a second alternative form of sipe according to the invention.
Figure 4B:
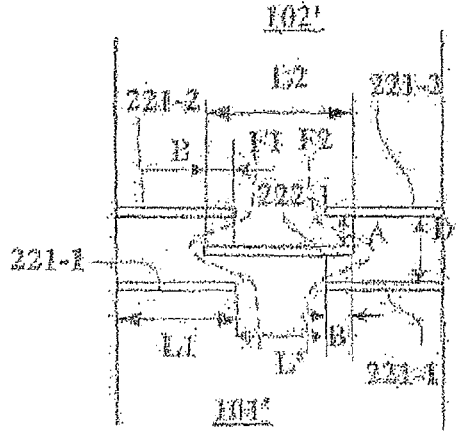
FIG. 4B shows the lines on the tread of this second alternative form of sipe after the tyre has become partially worn.

FIGS. 4A and 4B refer to one and the same second alternative form of the invention.

This second alternative form of moulding element 40 is derived from the first alternative form and comprises a first part 41 extended heightwise by a second part 42. The second part 42 comprises two first portions 421 flanking a second portion 422 (in this instance, first portions 421 open onto lateral faces of one and the same tread pattern element). The main difference compared with the first alternative form discussed with reference to FIGS. 3A to 3C lies in the fact that the single blade 422 of the second portion extends partially between the blades 421 of the first portions to form overlaps of length B (measured in the main direction XX'). FIG. 4B shows the line of the sipe moulded with this moulding element 40 following partial wear: it may be seen that two pairs of sipes 221-1, 221-2 are formed, the sipes of one and the same pair being distant from one another by a maximum distance D1 and a single sipe 222-1, the latter having a length L2 which is greater than the distance L' separating the two pairs of sipes 221-1, 221-2. Moreover, this single sipe 221-1 is interposed between the sipes 221-1, 221-2 of each pair over a length of overlap B equal to 25% of the length L1 of the sipes 221-1, 221-2 that make up each pair.

Figure 5A:
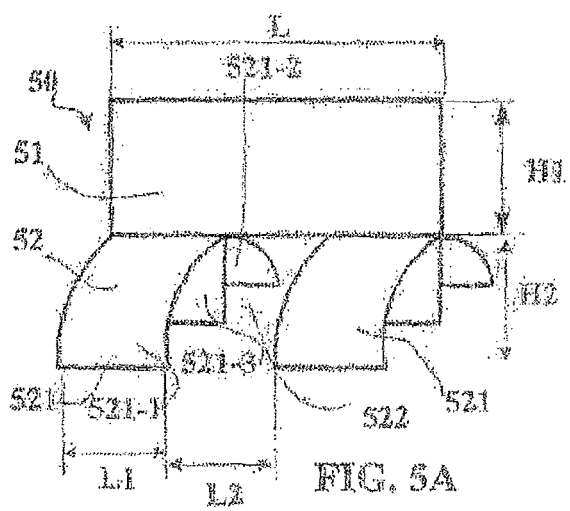
FIG. 5A is a view of a moulding element suitable for moulding a third alternative form of sipe according to the invention.
Figure 5B:
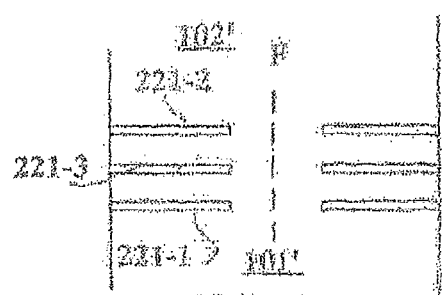
FIG. 5B shows the lines on the tread of the third alternative form of sipe after the tyre has become partially worn.

FIGS. 5A and 5B refer to one and the same third alternative form of embodiment of the invention. FIG. 5A shows a moulding element comprising an element first part 51 intended to project at the moulding surface of a mould used to manufacture a tread according to the invention. In the extension of this first part 51 is formed an element second part 52. This second part 52 comprises two moulding element first portions 521 each consisting of three blades 521-1, 521-2, 521-3, these blades being distant from one another by a distance A. Between the first portions 521 a moulding element second portion 522 has no blade in order to create a bridge of material of large cross section (of a width equal to L2 and a height equal to H2). In FIG. 5B, it can be seen that after the tread has become partially worn, two groups of three sipes 221-1, 221-2, 221-3, mutually parallel and of the same length, are formed. In this way, a bridge of material is created between those parts of the block that are situated on each side of the sipe (this bridge is indicated by a dotted line F). Beyond the depth H1 corresponding to the appearance of the three sipes on the tread surface, continuity is established between the material situated on one side and that situated on the other side. The person skilled in the art will be able to fine-tune the dimensions of the bridge (or bridges if there is a plurality of second portions) in order to obtain a rigidity suited to a length of sipe that is increased following partial wear.

Figure 6:
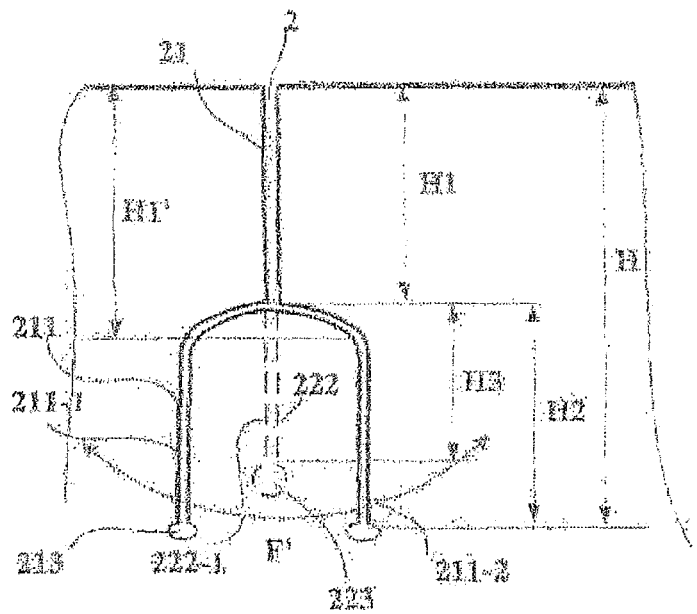
FIG. 6 is a cross section of a raised element comprising a fourth alternative form of sipe according to the invention.

FIG. 6 is a cross section of a raised element comprising a fourth alternative form of sipe 2 according to the invention, whereby the second portion 222 comprises a single sipe 222-1 of lesser depth H3 by comparison with the depth H2 of the sipes 221-1 and 221-2 that form the branches of the first portions 221. This alternative form makes it possible to increase the contribution to rigidity made by the connection between the parts of materials situated on either side of the sipe. Aside from the bridges of material formed as was the case with the sipes shown in the previous alternative forms of embodiment, a continuous line (identified by the dotted line F') is formed between the respectively front and rear parts 101' and 102'. Further, the ends nearest the inside of the tread are provided with widened parts 213, 223 in order to desensitize these ends from stress concentrations.

The geometry of the branches of the two sipes is such that the maximum width D1 is obtained after a level of wear corresponding to a depth H1' slightly beyond the depth H1 at which the two sipes appear. This width D1 is more or less maintained in the depth as far as the innermost points of the sipes.

Figure 7B:
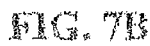
FIG. 7B shows the lines on the tread of the fifth alternative form of sipe in the as-new condition.
Figure 7A:
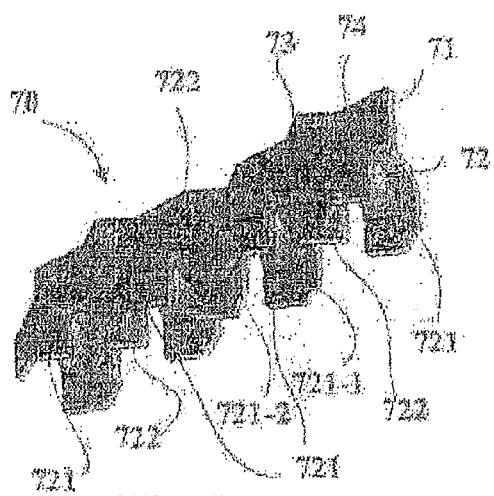
FIG. 7A is a view of a moulding element suitable for moulding a fifth alternative form of sipe according to the invention.
Figure 7C:
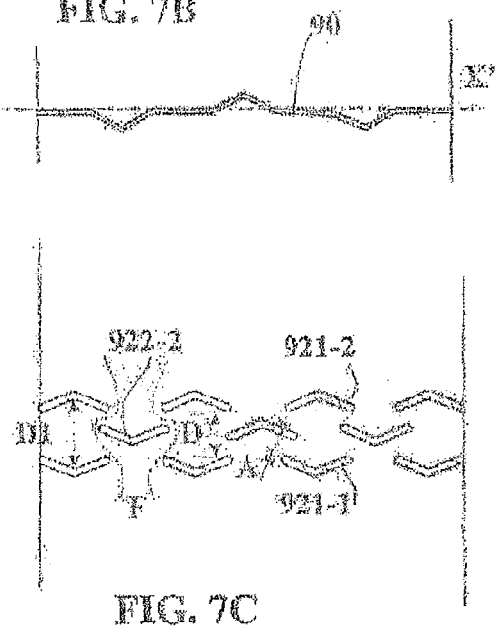
FIG. 7C shows the lines on the tread of the fifth alternative form of sipe after the tyre has become partially worn.

FIGS. 7A, 7B, 7C refer to one and the same fifth alternative form of the invention.

FIG. 7A is a perspective view of a moulding element 70 comprising an element first part 71 extended by an element second part 72. The element first part 71 consists of a single blade formed of a plurality of angled facets so as to form, on the tread surface in the as-new condition, a sipe line that runs in a zigzag as can be seen in FIG. 7B. Overall, this alternative form can be likened to the sipe shown in FIGS. 1 and 2, apart from the following differences:

a greater number of two-branch portions in the sipe second part, and a special zigzag shape in the main direction XX'.

This first part 71 is extended by a second part 72 made up of a succession of four first portions 721 each formed by a pair of blades 721-1, 721-2 and of three second portions 722 with a single blade 722-1, each second portion being interposed between two first portions. For each pair of blades, each blade is formed with two facets 73, 74 making between them an angle other than 180° (in this particular instance this angle is) 120°). The blades of a pair of one and the same portion are oriented so as to be in opposition as can be seen in FIG. 7C. Moreover, the single blade of each second portion is also formed of two facets making between them an angle other than 180°.

FIG. 7B shows, on the tread surface of the tread in the as-new condition, the hollow or sipe 90 moulded by the moulding element of FIG. 7A. In the main direction—a straight line passing through the end points of this hollow—identified by the straight line XX', the sipe follows a line formed of parts parallel to this main direction XX' and of parts that are inclined with respect to this direction. These inclined parts are extended in the second part of the sipe by single sipes having the same geometry.

FIG. 7C shows the hollows 921-1, 921-2, 922-1 formed on the tread surface of the tread when the latter has worn beyond the depth of the first part of the sipe. It may be seen that the sipe is broken down into several sipes 921-1, 921-2, 922-1 of two-segment angular line between them forming an angle of 120°, the sum of the lengths of these sipes 921-1, 921-2, 922-1 being very much greater than the initial length of the sipe when the tread was in the as-new condition. In this particular instance, there is no overlap between the sipes 921-1, 921-2 of the first portions and the sipe 922-1 of each second portion.

In this particular instance, the minimum distance A separating all points of the sipe 922-1 from the pairs of sipes 921-1, 921-2 is less than the minimum distance D between two sipes of the same pair. In this particular instance, the distance A is substantially equal to half the distance D considered at the ends of the sipes 921-1, 921-2 of the first portions. In this particular instance, the maximum distance D1 between two sipes 921-1, 921-2 of the first portions is greater than the minimum distance D; here the distance A is still at least equal to 20% of the maximum distance D1. The dotted lines indicated by the references F show the bridges of material formed to join together the parts of material situated on either side of the sipe 90.

Because the invention has been described in a general manner and using a number of alternative forms, it must be appreciated that this invention is not restricted to these alternative forms described and depicted alone. Obviously various modifications can be made thereto without departing from the overall scope of the present invention. Obviously all or some of the sipes described as being substantially perpendicular to the tread surface of the tread may be inclined at an angle other than 90° with respect to this same surface.

While all the examples depicted and described relate to sipes that open onto the lateral faces of the raised element in which the sipe according to the invention is made, it must be appreciated that the protection sought encompasses the case of sipes of the same structure but which do not open onto the lateral faces or alternatively which open onto only one lateral face.

In all the scenarios set out, the person skilled in the art is capable of adapting the shape of each sipe, notably by providing the presence of means capable of limiting the relative movements of one face with respect to the face opposite (for example by planning the formation of interlocking reliefs that limit or even block any relative movement of the faces).

The invention claimed is:

1. A tread made of a rubber compound for a tire, this tread having a thickness E and comprising a plurality of raised elements delimited by cuts, each raised element comprising:
    a contact face intended to come into contact with the road surface, and
    lateral faces intersecting this contact face along edge corners,
wherein a collection of contact faces of the raised elements forms a tread surface of the tread,
wherein at least one of these raised elements comprises at least one sipe of a maximum depth (H) at most equal to the thickness (E) of the tread, this at least one sipe running in a main direction determined by the ends of the line of the at least one sipe on the tread surface in the as-new condition and a secondary direction running into the thickness of the tread, wherein this at least one sipe is made up of a first part and a second part,
    wherein the sipe first part runs in the secondary direction between the contact face in the as-new condition and a depth (H1) at least equal to 40% of the maximum depth (H), and
    wherein the sipe second part extends the sipe first part into the thickness of the tread,
    wherein this sipe second part extends over a depth (H2),
    wherein the sipe first part, of total length (L) measured on the tread surface when the tread is in the as-new condition in the main direction, divides the raised element over the depth (H1) into two raised-element parts which are disjointed from one another, wherein:
    the sipe second part comprises, in the main direction of the sipe, at least one first portion and at least one second portion, these two portions each having a length less than the length (L),
    each first portion being formed of a sipe comprising at least two branches disjointed from one another, wherein these at least two branches are spaced from one another by a maximum distance (D1), and wherein the at least two branches of a first portion are not offset from each other relative to the main direction of the sipe, and
    each second portion, situated in the extension of a first portion in the main direction of the sipe and disjointed from any first portion, being formed in such a way as to create a mechanical connection between the extensions into the depth over the height (H2) of the raised-element parts that are disjointed from one another between the contact face and the depth (H1).

2. The tread according to claim 1, wherein each second portion comprises at least one sipe formed in the extension of the sipe extending over the depth (H1) from the tread surface of the tread in the as-new condition, this at least one sipe being disjointed from the sipes of any first portion.

3. The tread according to claim 2, wherein each second portion comprises a single sipe formed in the extension of the sipe extending over the depth (H1).

4. The tread according to claim 3, wherein, with the single sipe of each second portion having a bottom formed by its points furthest towards the interior of the tread, any point on the bottom of the single sipe is situated a non-zero minimum distance (A) away from the branches of the first portions.

5. The tread according to claim 4, wherein the minimum distance (A) is at least equal to 20% of the distance (D1).

6. The tread according to claim 5, wherein the single sipe of a second portion formed in the extension of the sipe first part has a length measured in the main direction of the sipe, that is such that at least part of this single sipe is interposed between two sipes of a first portion over a non-zero length of overlap B at most equal to 50% of the length (L1) of each first portion, each first portion having the same length (L1).

7. The tread according to claim 1, wherein the total length of edge corners formed by the sipe after partial wear beyond (H1) is at least equal to 1.5 times the length of edge corners formed by the sipe on the tread in the as-new condition.

8. The tread according to claim 1, wherein a plurality of sipe first portions are present, and wherein the distance separating two sipe first portions is at least equal to 50% of the length (L1) of each first portion.

* * * * *